Dec. 8, 1959     H. D. HUME     2,916,138
COUNTERBALANCE MEANS FOR CROP LOADER DRAPERS
Filed March 3, 1958     3 Sheets-Sheet 1
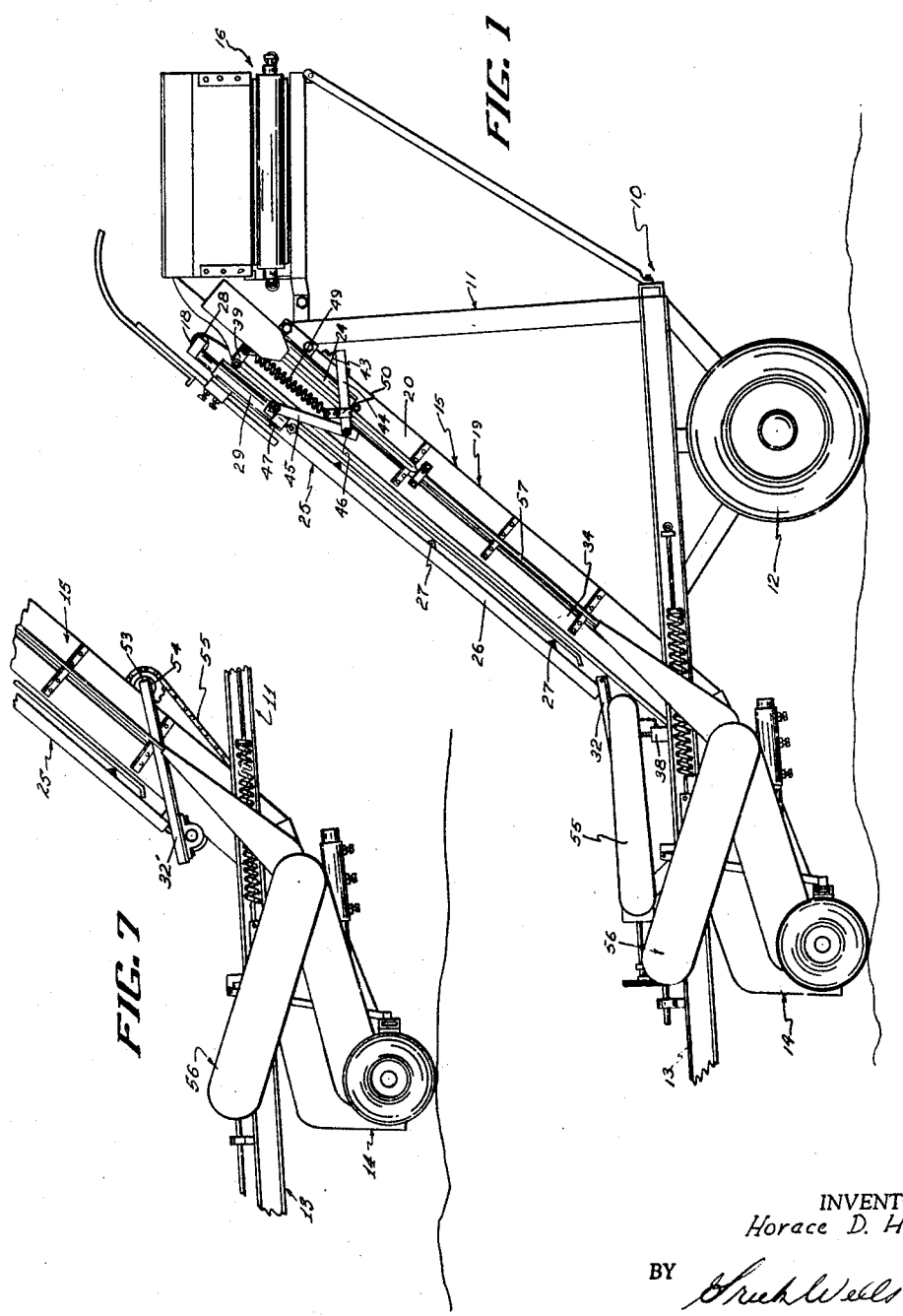
INVENTOR.
Horace D. Hume
BY

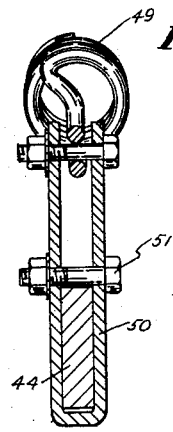
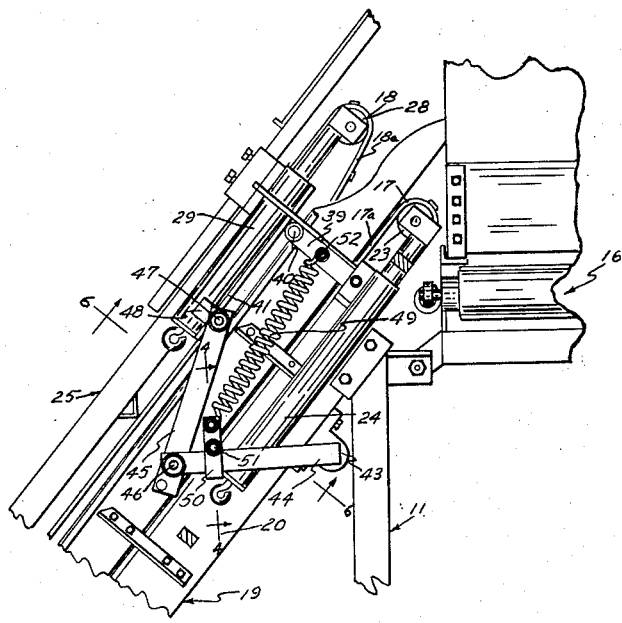
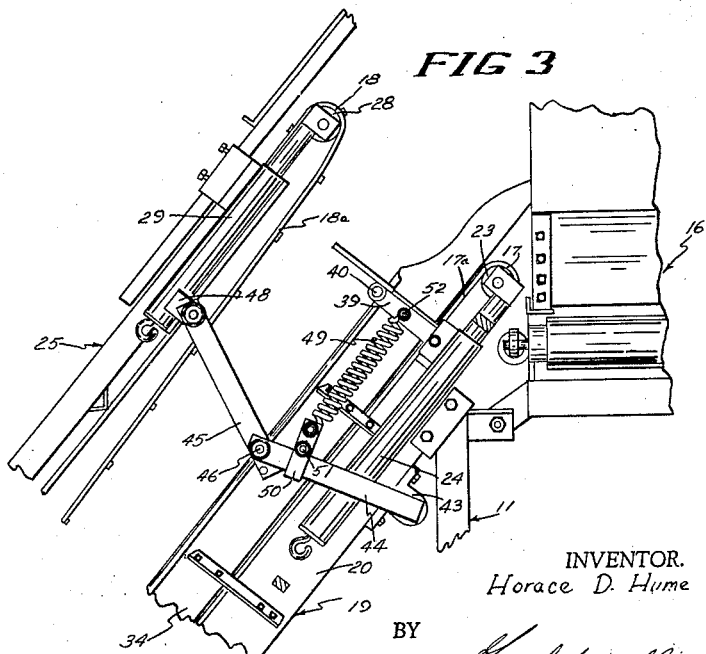
INVENTOR.
Horace D. Hume

Dec. 8, 1959   H. D. HUME   2,916,138
COUNTERBALANCE MEANS FOR CROP LOADER DRAPERS
Filed March 3, 1958   3 Sheets-Sheet 3
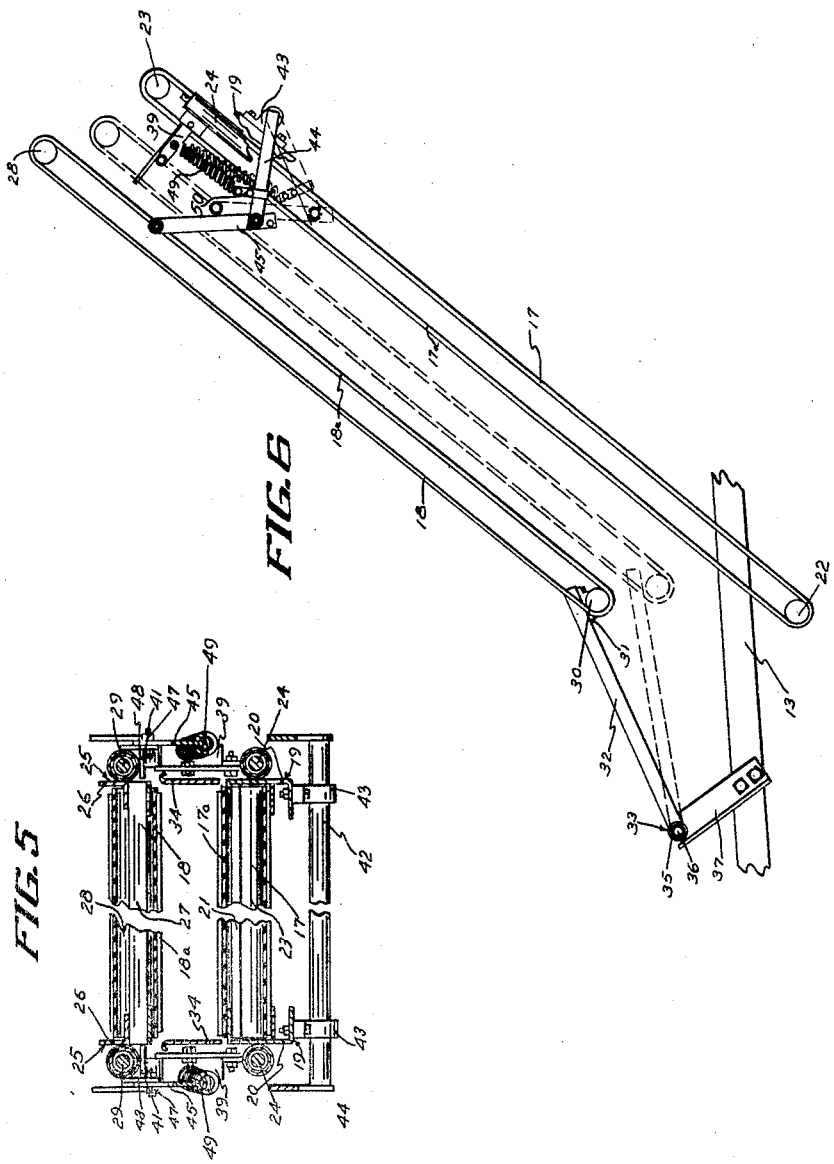
INVENTOR.
Horace D. Hume
BY United States Patent Office 2,916,138
Patented Dec. 8, 1959

2,916,138
COUNTERBALANCE MEANS FOR CROP LOADER DRAPERS

Horace D. Hume, Mendota, Ill.

Application March 3, 1958, Serial No. 718,575

5 Claims. (Cl. 198—165)

The present invention relates to improvements in counterbalancing means for crop loader drapers.

In the harvesting of vine crops such as peas, beans and the like, and in the harvesting of such other crops as spinach, etc., crop loaders are frequently used to elevate the cut crops into transporting vehicles for further processing remote from the field. These crop loaders normally include a steeply inclined conveyor comprised of spaced apart upper and lower drapers, the adjacent flights of which move upwardly and carry the crop therebetween. In the past, the upper and lower drapers of such machines have been mounted in fixed relation to each other, and considerable operational difficulty has resulted. Fixed conveyors compress and pack the crops therebetween, and are susceptible to clogging or jamming in the event that too large a bunch of crop is fed between them.

In my co-pending application for Letters Patent, Ser. No. 670,256, I have disclosed an improved construction that overcomes these difficulties. That improvement comprises means for mounting the upper draper for free bodily movement toward and away from the lower draper to permit the upper draper to ride upon the crop, thereby reducing the packing and compressing, and preventing plugging, clogging or jamming.

It is the principal purpose of the present invention to provide in a device such as that disclosed in my co-pending application mentioned above, means to counterbalance the weight of the upper draper of the inclined conveyor to permit it to float upon the crop therebeneath in a substantially weightless manner, whereby to move the crop without compressing or crushing it.

More specifically stated, it is the purpose of this invention to provide in an inclined conveyor comprising an upper draper and a lower draper, the adjacent flights of which move in a common direction, the upper draper being supported for bodily movement toward and away from the lower draper, improved means for counterbalancing the weight of the upper draper against its supporting means whereby to float the upper draper above the lower draper in a substantially weightless manner.

This and other objects and advantages of the invention will appear more clearly from the following description and the accompanying drawings wherein preferred forms of the invention are shown. It should be understood, however, that the drawings and description are illustrative only and are not intended to limit the invention except insofar as it is limited by the claims.

In the drawings:

Figure 1 is a side elevational view of a crop loader embodying my invention;

Figure 2 is an enlarged fragmentary side elevational view with parts broken away, illustrating my improved counterbalancing means;

Figure 3 is a view similar to Figure 2, but showing the upper draper raised;

Figure 4 is a fragmentary sectional view taken on the line 4—4 of Figure 2;

Figure 5 is an enlarged fragmentary sectional view taken on the line 5—5 of Figure 2;

Figure 6 is a somewhat diagrammatic illustration showing the operation of the device and illustrating a changed position thereof in dotted lines; and Figure 7 is a fragmentary elevational view illustrating a modification.

Referring now in detail to the drawings, my invention is shown as embodied in the crop loader 10 designed in the manner disclosed in my prior co-pending application referred to earlier herein. The crop loader 10 comprises a main frame 11 having supporting wheels 12 thereon, and having a draw bar 13 extending forwardly therefrom. The frame 11 supports a pick up mechanism 14 at its lower front end which is operable to engage the crops and elevate them from the ground up into the loader. Behind the pick up mechanism 14, an elevating conveyor 15 is provided. The elevating conveyor 15 is operable to elevate the cut crop upwardly to a transverse delivery conveyor 16 mounted on the frame 11 at the upper end of the elevating conveyor 15. The delivery conveyor 16 is adapted to deliver the elevated crop to a suitable transporting vehicle such as a truck or a wagon.

The present invention relates to the construction and operation of the elevating conveyor 15. The remaining elements of the loader 10, heretofore described in general terms are of well known construction and will not be described in detail.

The elevating conveyor 15 comprises a lower draper 17 and an upper draper 18. These drapers 17 and 18 have upwardly moving adjacent flights 17a and 18a that receive the crop to be elevated therebetween and carry it upwardly at a fairly steep angle, depositing it at the upper end upon the delivery conveyor 16. The lower draper 17 is supported by an inclined framework 19, which includes spaced apart side frame members 20 connected together by suitable cross bracing 21. At the lower end of the framework 19, a draper roller 22 is provided. The draper roller 22 is rotatably mounted between the spaced apart side frame members 20 and provides the lower rotatable end support for the draper 17. At the upper end of the framework 19, a second draper roller 23 is provided. The draper roller 23 is supported by spring tensioned mounting devices generally indicated at 24. The devices 24 are carried by the framework 19 and are operable to urge the roller 23 outwardly endwise of the framework 19 to keep the draper 17 taut.

The upper draper 18 is supported upon a framework 25 above the lower draper 17. The framework 25, as illustrated best in Figure 5, comprises spaced apart angle irons 26 tied together at intervals by transverse angle irons 27. At the upper end of the framework 25, a draper roller 28 is mounted. The roller 28 provides the upper rotatable end support for the draper 18 and is mounted on the frame 25 by spring tensioning devices 29 which urge it outwardly to maintain the draper 18 taut. At the lower end of the framework 25, a lower draper roller 30 is provided. For the sake of convenience in construction, the lower draper roller 30 is not mounted directly to the frame 25, but is journalled in bearings 31 which are fixed to spaced apart carrying arms 32 that are pivoted to the lower end of the draper frame 25 as shown at 33. The purpose of the carrying arms 32 will be described later herein.

With the construction just described, the draper frames 19 and 25 support the lower and upper drapers 17 and 18 respectively in position to receive crops therebetween and convey them upwardly. In order to confine the crops between the drapers 17 and 18 during their upper travel, guide shields 34 are provided at each side of the lower draper carrying frame 19. The guides 34 extend upwardly at each side of the upper flight 17a of the lower draper 17 and confine the crop therebetween.

The upper draper carrying frame 25 is supported above the lower draper carrying frame 19 by the forwardly extended arms 32. As best illustrated in Figure 6, the arms 32 are fixed at their forward ends to a sleeve 35 which is rotatably mounted on a shaft 36 supported on the main frame 11. The shaft 36 is journalled in upstanding lugs 37 rigidly secured to the main frame 11. The arms 32, being pivoted to the frame 11 at their forward ends, support the upper draper carrying frame 25 above the lower draper carrying frame 19 for free movement toward and away from the lower draper carrying frame 19. Stop members 38 fixed on the frame 11 engage the carrying arms 32 to limit their downward movement and thus support the lower end of the upper draper carrying frame 25 in spaced relation to the lower draper carrying frame 19 to prevent the draper 18 from entangling with the lower draper 17 when there are no crops therebetween.

At the upper ends of the drapers 17 and 18, stop means are also provided to maintain the drapers in spaced relation. These stop means comprise upwardly extending bars 39 fixed to the lower draper carrying frame 19. The bars 39 have cylindrical stop lugs 40 at their upper ends which are adapted to engage plates 41 fixed to the spring tensioning devices 29 on the upper draper carrying frame 25 to limit the movement of the upper draper carrying frame 25 toward the lower draper carrying frame 19.

In order to provide for equal movement of both side edges of the upper draper carrying frame 25 as it rides upon the crop being elevated, and to prevent warping of the frame 25 in the event that the elevated crop is not evenly distributed and tends to raise one side of the frame 25 higher than the other, levelling means are provided. As illustrated best in Figures 2, 3 and 5, a cross shaft 42 is journalled beneath the lower draper carrying framework 19 in bearings 43 supported on the framework 19. The shaft 42 projects outwardly at each side of the framework 19 and has a lever arm 44 fixed at each end. The lever arms 44 have second levers 45 pivoted to the free ends by bolts 46. The levers 45 are pivoted by bolts 47 to ears 48 attached to the spring tensioning devices 29 on the framework 25. With this construction, any upward movement of one side of the framework 25 is communicated through the levers 44 and 45 to the cross shaft 42, which transmits the movement to the opposite side of the frame 25 through the levers 44 and 45 on that side, thus maintaining the framework 25 constantly level in a transverse direction.

The principal object of this invention is to provide means for counterbalancing the weight of the upper draper carrying frame 25 and the draper 18 carried thereby so that the frame 25 is substantially weightless and free to float above the crop being conveyed between the drapers 17 and 18 to urge it upwardly without compressing or packing the crop. I provide this counterbalancing effect by mounting a tension spring 49 between the lever arm 44 at each side of the lower draper frame 19, and the frame 19 itself. As shown best in Figures 2, 3 and 4, this tension spring 49 is connected at one end to a U-shaped strap 50 which is clamped to the lever arm 44 by a bolt 51. The other end of the spring 49 is connected to a bolt 52 supported upon the upright stop member 39 which is rigidly secured to the frame 19. With this construction, the springs 49 at each side of the frame 19 urge the lever arms 44 in a direction to lift the upper draper frame 25 away from the lower draper frame 19, thus counteracting the weight force of the frame 25 and permitting it to "float" above the frame 19.

While the springs 49 are located near the elevated end of the frame 25, nevertheless, due to the connection between the upper draper frame 25 and the fixed elements of the loader 10, they serve to counterbalance the weight of the whole frame 25 and not merely the upper end thereof. As illustrated in Figure 6, the carrying arms 32 at the lower end of the frame 25 extend away from the frame 25 at an angle above the plane of the frame 25. Due to this relationship, movement of the lower end of the frame 25 on the arms 32 away from the lower draper frame 19 is accompanied by some endwise movement of the frame 25 parallel to the frame 19. This being true, it follows that by pulling the frame 25 parallel to the plane of the frame 19 toward the upper end thereof, the upper draper frame 25 may be lifted away from the frame 19. Thus, by exerting force on the frame 25 tending to pull it lengthwise of the lower draper frame 19, the weight force of the lower end of the frame 25 may be counteracted. It will be apparent from the drawings that the springs 49 do exert such an endwise force on the frame 25. As the springs 49 urge the lever arms 44 to pivot toward the upper end of the frame 19 to lift the frame 25 away, they also exert force through the levers 45 tending to move the frame 25 lengthwise of the frame 19, and thus counterbalance the whole of the frame 25 and draper 18 thereon.

Due to the construction of the U-shaped straps 50 which permits them to be slid along the lever arms 44, the counterbalancing effect of the springs 49 may be readily altered to meet the particular conditions present. It is thus possible for the operator to adjust the mechanism to create whatever riding pressure the particular crop being loaded requires.

In Figure 1 I have shown a somewhat modified form of the invention wherein the carrying arms 32' for the lower end of the frame 25 are extended rearwardly instead of forwardly and are pivoted upon a cross shaft 53 journalled in bearings 54 on the lower draper frame 19. The arms 32' so positioned perform the same function in the same manner and with the same results as the construction shown in the main form of the invention.

I have not described the means for driving the various elements of the loader for the reason that they form no part of this invention and are identical to the drive means shown and described in my co-pending application earlier herein mentioned. Suffice it to say that both the upper draper 18 and the lower draper 17 are driven to move their adjacent flights upwardly. The upper draper 18 is driven by power transmitting means 55 coupled to the lower roller 30 and extending along one of the arms 32 to its pivotal connection with the frame 11 and thence to a common drive means 56. The lower draper 17 is driven from the upper draper roller 23 by power transmitting means 57 extending upwardly from the common drive means along the inclined lower draper frame 19.

In the form of the invention shown in Figure 7, the power transmitting means 55' for the upper draper 18 extends rearwardly along one of the arms 32 to its pivotal connection with the frame 11, and thence to the common drive means on the frame 11.

It is believed that the nature and advantages of my invention appear clearly from the foregoing.

Having thus described my invention, I claim:

1. In a crop loader having a main frame and having an inclined crop conveyor on the main frame comprising an inclined lower draper frame supported on the main frame, a lower draper mounted in said lower draper frame, an inclined upper draper frame positioned above said lower draper frame and an upper draper mounted in said upper draper frame, the improvement in means for supporting said upper draper frame above said lower draper frame for free floating movement thereabove, said improvement comprising carrying arms pivoted to the lower end of said upper draper frame and extending away from the lower end of said upper draper frame at an angle to the upper draper frame, said arms being pivoted to the loader swing up and down and thereby to support the lower end of said upper draper frame for movement toward and away from the lower draper frame, first lever arms pivoted to the lower draper frame adjacent the upper end thereof, second lever arms pivoted to said first lever arms and extending upwardly toward the upper end of said upper draper frame, said second lever arms being pivoted to the upper draper frame adjacent its upper end, and spring means connected between said first named lever arms and the lower draper frame, said spring means being operable to urge the first named lever arms to pivot in a direction to lift the upper draper frame.

2. The invention defined in claim 1 wherein the spring means comprise strap means clamped to said first named lever arms and coil springs connected to said strap means and to the lower draper frame.

3. In a crop loader having a main frame and having an inclined crop conveyor on the main frame comprising an inclined lower draper frame supported on the main frame, a lower draper mounted in said lower draper frame, an inclined upper draper frame positioned above said lower draper frame, and an upper draper mounted in said upper draper frame, the improvement in means for supporting said upper draper frame above said lower draper frame for free floating movement thereabove, said improvement comprising carrying arm means pivoted to the lower end of said upper draper frame and extending away from the lower end of said upper draper frame at an angle to the upper draper frame, said arms being pivoted to the crop loader and to swing up and down thereby supporting the lower end of the framework for movement away from the lower draper frame and endwise of the lower draper frame toward the upper end thereof, first lever arms pivoted to the lower draper frame near the upper end thereof, second lever arms pivoted to said first lever arms and extending upwardly toward the upper end of said upper draper frame, said second lever arms being pivoted to the upper draper frame, and spring means connected between the first named lever arms and the lower draper frame urging the first named lever arms to pivot in a direction to raise the upper draper frame away from the lower draper frame and to urge the upper draper frame endwise toward the upper end of the lower draper frame.

4. In a crop loader having a main frame and having an inclined crop conveyor on the main frame comprising an inclined lower draper frame supported on the main frame, a lower draper mounted in said lower draper frame, an inclined upper draper frame positioned above said lower draper frame, and an upper draper mounted in said upper draper frame, the improvement in means for supporting said upper draper frame above said lower draper frame for free floating movement thereabove, said improvement comprising carrying arm means pivoted to the lower end of said upper draper frame and extending away from the lower end of said upper draper frame at an angle to the upper draper frame, said arms being pivoted to the crop loader and to swing up and down thereby supporting the lower end of the framework for movement away from the lower draper frame and endwise of the lower draper frame toward the upper end thereof, a transverse shaft journalled on said lower draper frame, first lever arms fixed to said shaft and extending radially therefrom, second lever arms pivoted to said upper draper frame and extending downwardly toward the lower end of said lower draper frame and pivoted to said first named lever arms whereby to maintain the upper draper frame level in a transverse direction, and spring means connected between said first named lever arms and the lower draper frame urging said lever arms to pivot in a direction to raise the upper draper frame and to move it endwise of the lower draper frame toward the upper end thereof whereby to counterbalance the weight of said upper draper frame and cause it to float above the lower draper frame in substantially weightless condition.

5. The invention defined in claim 4 wherein the spring means comprise strap means clamped to said first named lever arms and coil springs connected to said strap means and to the lower draper frame.

References Cited in the file of this patent

UNITED STATES PATENTS 1,624,703    Witte _____ Apr. 12, 1927